United States Patent Office 3,486,598
Patented Dec. 30, 1969

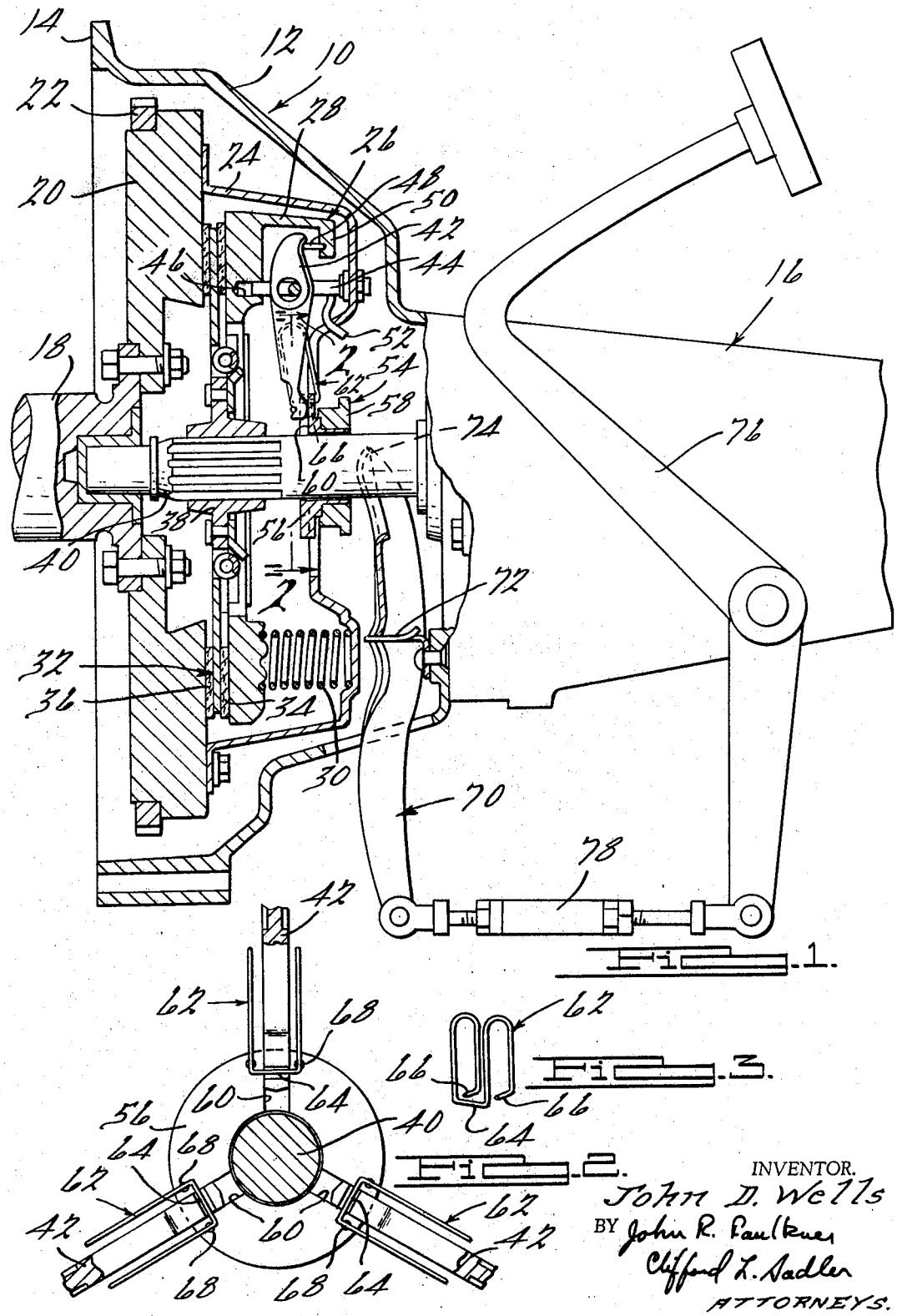

3,486,598
CLUTCH WITH LEVER SUPPORTER BEARING
John D. Wells, Plymouth, Mich., assignor to Ford Motor
Company, Dearborn, Mich., a corporation of Delaware
Filed Sept. 7, 1967, Ser. No. 666,211
Int. Cl. F16d 19/00
U.S. Cl. 192—98                                    1 Claim

ABSTRACT OF THE DISCLOSURE

A vehicle clutch construction having a means for mounting the clutch release bearing on the clutch pressure plate assembly instead of on the conventional tubular transmission bearing retainer extension.

BACKGROUND OF THE INVENTION

In clutch constructions for motor vehicles in accordance with prior art teachings, a tubular extension protrudes from the transmission into the clutch housing and encloses the driving or input shaft of the transmission. The clutch release bearing slides along and is guided by this tubular extension. The clutch release lever engages the release bearing and is constructed to move it axially into engagement with the pressure plate levers or fingers.

Sliding friction occurs where the release bearing rides on the tubular extension and this friction increases as the clutch disc wears due to the accumulation of clutch disc material on the tubular extension. The increase in friction is reflected in an increase in clutch pedal effort. Because the clutch disc material accumulates on the tubular extension in an erratic manner and because the grease initially placed on the extension becomes contaminated and eroded away, the clutch pedal develops a very scrubby or ratchety feel. This effect is disturbing to the vehicle operator and is undesirable.

BRIEF SUMMARY OF THE INVENTION

The present invention eliminates the tubular extension from the transmission and all of the problems assosiated with it. The release bearing is mounted on the pressure plate levers by a unique construction and thereby dispenses with the need for a tubular extension or guide.

A unique release bearing hub has three milled slots spaced 120° apart that permits the hub to be mounted on the three pressure plate levers. The pressure plate levers are similar to conventional construction except that their width is more closely held dimensionally. Minimum clearance between the hub slots and the pressure plate levers causes the hub to be positioned concentrically with respect to the pressure plate. The hub is held to the pressure plate levers by three hairpin type springs. The release bearing is press fitted to the hub in a conventional manner for engagement by the clutch release lever.

BRIEF DESCRIPTION OF THE DRAWINGS

The many advantages of a clutch construction in accordance with the present invention will become apparent upon consideration of the following detailed discussion and the accompanying drawings in which:

FIG. 1 is a side elevational view, partly in section, of a motor vehicle clutch incorporating the present invention;

FIG. 2 is a sectional view taken along section lines 2—2 of FIG. 1; and

FIG. 3 is a perspective view of the spring retainer which connects the clutch hub to the pressure plate levers.

DETAILED DESCRIPTION OF THE INVENTION

Referring now to the drawings for a detailed description of the presently preferred embodiment of this invention, FIG. 1 illustrates a clutch 10 for use in a motor vehicle. The clutch includes a housing 12 having a flat forward surface 14 that is constructed to be bolted to a vehicle engine block. A transmission 16 is bolted to the rear face of the clutch housing 12.

The rear end of an engine crankshaft 18 is bolted to a flywheel 20. A ring gear 22 is secured to the periphery of the flywheel and is adapted to be engaged by the gear of a starter motor. A clutch cover 24 is secured to the rear surface of the flywheel 20 and contains a pressure plate assembly 26.

The assembly 26 includes a pressure plate 28 that is urged by circumferentially spaced apart coil springs 30 into engagement with a clutch disc 32. The springs 30 are interposed between cover 24 and the plate 28. The clutch disc is situated between the pressure plate 28 and the flywheel 20 and has a first friction material facing 34 that engages the plate 28 and a second friction material facing 36 that engages the flywheel 20. The spring 30 forces the pressure plate 28 forwardly to trap the disc 32 between the plate 28 and the flywheel 20 so that these three elements will rotate conjointly at engine speed.

The clutch disc 32 has a hub portion 38 that is internally bored and splined. A transmission input shaft 40 protrudes forwardly from the transmission 16 and has a splined portion that drivingly and slidably engages the hub 38 of the clutch disc 32.

Means are provided for moving the pressure plate rearwardly against the force of the springs 30 for the purposes of disengaging the clutch. In accordance with this invention, three circumferentially spaced pressure plate levers 42 are pivotally mounted on pivot bolts 44. The bolts 44 are secured to the clutch cover 24 and provide a fulcrum support for a midportion of the pressure plate levers 42. The bolts 44 slidably engage drilled guide holes 46 in the pressure plate. A link 48 is interposed between the outer ends of each lever 42 and the pressure plate 28. In order to provide for this engagement the pressure plate 28 has three circumferentially spaced apart axially extending hook-shaped portions 50. An anti-rattle spring 52 engages the lever 42 and is positioned to maintain the link 48 in compression.

Means are provided to connect a clutch release bearing assembly 54 to the pressure plate release levers 42. The assembly 54 comprises a hub portion 56 and a bearing portion 58. The hub portion has three spaced radially extending milled slots 60. Each of the slots 60 receives the inner end of a pressure plate lever 42. The dimensions of the slots 60 and the width of the levers 42 are maintained within close tolerances so that there is a minimum of clearance. In this way, the hub 56 is contained concentrically with respect to the pressure plate 28. The hub 56 is held to the pressure plate levers by hairpin type springs 62 as seen in FIG. 3. The springs 62 have a midportion 64 that extends transversely to its length and engages a slot near the end of the lever 42. The ends 66 of the spring 62 extend in an axial direction and are situated in holes 68 in the hub 56.

The release bearing 58 of the assembly 54 is pressed onto the hub 56. A clutch release lever 70 is connected to the clutch housing 12 by a fulcrum means 72. The inner end 74 of the lever 70 is bifurcated in the usual manner to engage the bearing 58. A clutch pedal 76 is mounted on the transmission or some other convenient point in the vehicle chassis. The pedal is connected to the release lever 70 by means of a link 78.

When the clutch pedal is moved forwardly, the release lever 70 will pivot in a counterclockwise fashion to engage the bearing 58. The bearing assembly 54 will then move to the left causing the pressure plate levers 42 to pivot in a clockwise manner. This will draw the pressure plate to the right out of engagement with the clutch disc 32. Under these conditions, no torque will be transmitted from the rotating flywheel 20 and pressure plate assembly 26 through the disc 32 to the transmission shaft 40.

The cooperation between the levers 42 positioned in the slots 60 and the springs 62 connecting the levers 42 with the hub 56 positions the bearing assembly 54. The hub 56 will remain concentric to the pressure plate assembly 26 throughout the total travel of the pressure plate levers 42 due to the angularity of the levers. This eliminates the need for the usual tubular extension to guide and maintain the concentricity of the release bearing. The release bearing 58 will rotate at the same speed as the pressure plate assembly until such time as the clutch pedal 76 is depressed. When the pedal is depressed and the release lever 70 moves against the rear race of the release bearing 58, the bearing will stop and will actuate the levers 42. Additional travel will load the bearing and move the pressure plate levers 42 which, in turn, will disengage the clutch.

The foregoing description presents the presently preferred embodiment of this invention. Modifications and alterations may occur to those skilled in the art that will come within the scope and spirit of the following claim.

I claim:
1. A clutch for a motor vehicle comprising a clutch cover, a fly wheel, said cover being secured to said fly wheel, a pressure plate, a clutch disc interposed between said pressure plate and said fly wheel, pressure plate levers interposed between said cover and said pressure plate, said levers extending radially inwardly, a release bearing assembly having a hub portion, said hub portion engaging each of said levers near its end, said disc engaging a shaft, a housing enclosing said cover and providing a pivot support for a clutch release lever, said lever having a bifurcated end engaging said bearing assembly and constructed to move said bearing assembly axially along said shaft, said bearing assembly being spaced apart from said shaft, means constructed to connect said hub portion to said levers and to position said hub portion concentrically with respect to said pressure plate, said hub portion having angularly spaced apart slots constructed to receive said levers, said levers being positioned in said slots, said levers being in sliding engagement with the radial walls of said slots, a plurality of wire springs each engaging said hub portion and one of said levers and constructed to exert a spring force urging said levers into engagement with said hub portions, said springs having end portions affixed to said hub portion, said springs each having a circumferentially extending midportion seated in a groove formed on each of said levers.

References Cited

UNITED STATES PATENTS

| 3,093,228 | 6/1963 | Binder | 192—89 |
| 3,211,265 | 10/1965 | Crutchley. | |
| 3,337,016 | 8/1967 | Maucher | 192—98 XR |
| 2,765,060 | 10/1956 | Stenger. | |
| 2,863,537 | 12/1958 | Root | 192—98 XR |
| 3,241,643 | 3/1966 | Montgomery | 192—98 XR |
| 3,254,747 | 6/1966 | Werner | 192—98 XR |

FOREIGN PATENTS

| 419,834 | 11/1934 | Great Britain. |
| 768,290 | 2/1957 | Great Britain. |

BENJAMIN W. WYCHE III, Primary Examiner

U.S. Cl. X.R.

192—99